(12) United States Patent
Guigou et al.

(10) Patent No.: US 10,215,450 B2
(45) Date of Patent: Feb. 26, 2019

(54) HEATING, VENTILATION AND/OR AIR-CONDITIONING EQUIPMENT COMPRISING A DEVICE FOR CONTROLLING THE TEMPERATURE OF A BATTERY, AND METHOD FOR IMPLEMENTING SAME

(71) Applicant: Valeo Systemes Thermiques

(72) Inventors: Pascal Guigou, Fontenay aux Roses (FR); Mohamed Yahia, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 0 days.

(21) Appl. No.: 14/395,891

(22) PCT Filed: Apr. 19, 2013

(86) PCT No.: PCT/EP2013/058204
§ 371 (c)(1),
(2) Date: Oct. 21, 2014

(87) PCT Pub. No.: WO2013/160209
PCT Pub. Date: Oct. 31, 2013

(65) Prior Publication Data
US 2015/0128626 A1   May 14, 2015

(30) Foreign Application Priority Data

Apr. 24, 2012 (FR) ........................ 12 53763

(51) Int. Cl.
*F25B 5/02* (2006.01)
*H01M 10/06* (2006.01)
(Continued)

(52) U.S. Cl.
CPC ......... *F25B 1/005* (2013.01); *B60H 1/00278* (2013.01); *H01M 10/613* (2015.04);
(Continued)

(58) Field of Classification Search
CPC .... B60H 1/00392; B60H 1/004; B60H 1/003; B60H 1/00278; B60H 1/00285;
(Continued)

(56) References Cited

U.S. PATENT DOCUMENTS 6,279,331 B1 * 8/2001 Hirota ................ B60H 1/00885
62/117
6,370,903 B1 * 4/2002 Wlech ................ B60H 1/00385
165/104.12
(Continued)

FOREIGN PATENT DOCUMENTS

DE    10 2010 033 188 A1    2/2012
DE    10 2010 039 028 A1    2/2012
(Continued)

OTHER PUBLICATIONS

International Search Report for Application No. PCT/EP2013/058204 dated Jul. 19, 2013, 6 pages.
(Continued)

*Primary Examiner* — Frantz Jules
*Assistant Examiner* — Erik Mendoza-Wilkenfe
(74) *Attorney, Agent, or Firm* — Howard & Howard Attorneys PLLC

(57) ABSTRACT

The invention relates to heating, ventilation and/or air-conditioning equipment (1) including a device (9) for controlling the temperature of a battery (7) of an automobile including at least a compressor (11), a condenser (13), a first expansion member (15), a thermal-conditioning exchanger (17) for exchanging heat between a coolant and a heat-transport fluid (FC), and switching means. The temperature control device (9) includes at least one bypass line (9b) connecting an outlet of the compressor (11) to an inlet of the thermal-conditioning exchanger (17) while bypassing the condenser (13). The invention also relates to a method for
(Continued)

Figure 1:
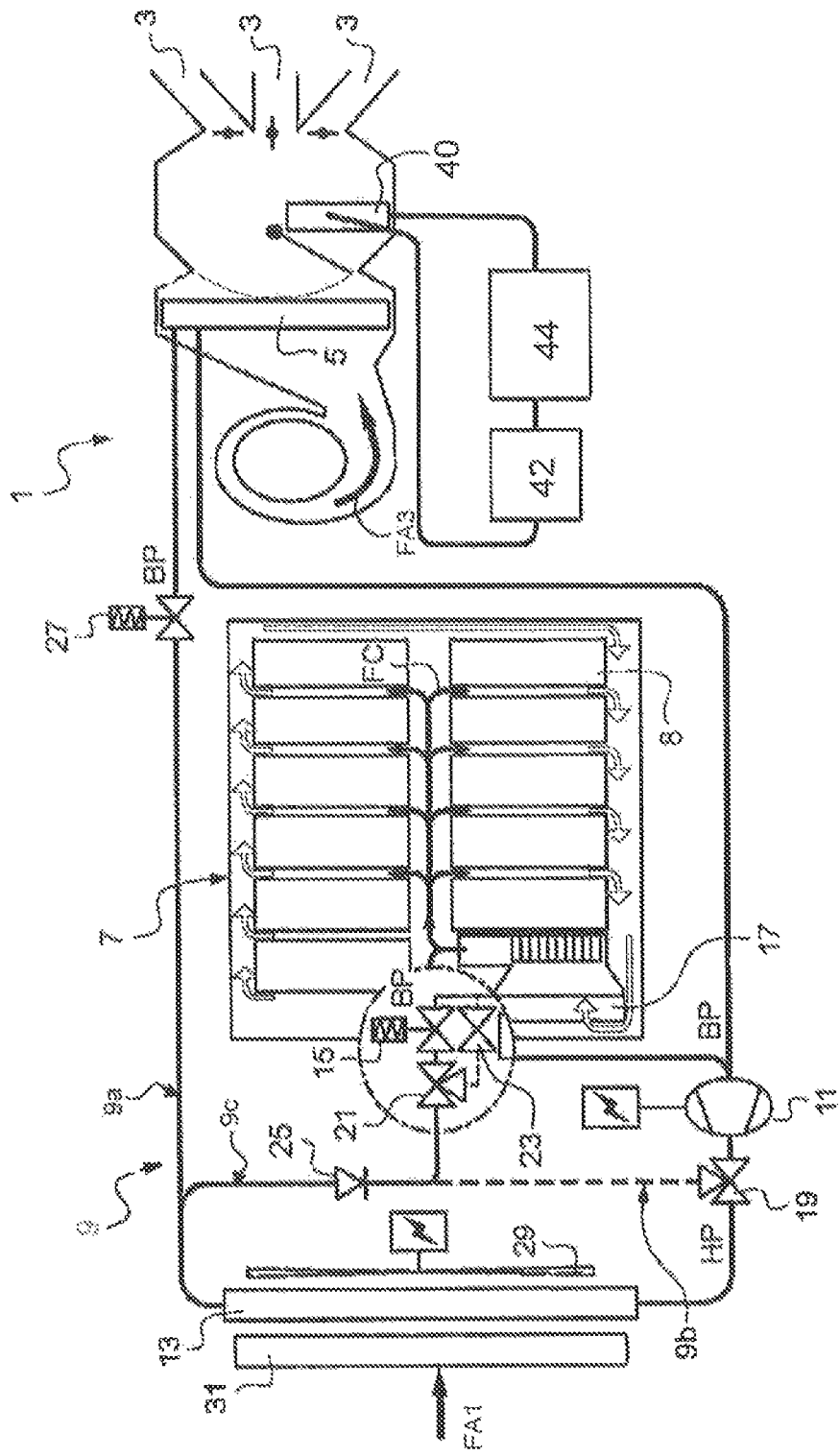

controlling the temperature of an automobile battery (7) implemented by means of such heating, ventilation and/or air-conditioning equipment (1).

16 Claims, 4 Drawing Sheets

(51) Int. Cl.
| | |
|---|---|
| *F25B 1/10* | (2006.01) |
| *B60H 1/00* | (2006.01) |
| *F25B 5/00* | (2006.01) |
| *F25B 1/00* | (2006.01) |
| *H01M 10/625* | (2014.01) |
| *H01M 10/663* | (2014.01) |
| *H01M 10/6568* | (2014.01) |
| *H01M 10/613* | (2014.01) |
| *H01M 10/615* | (2014.01) |

(52) U.S. Cl.
CPC ..... *H01M 10/625* (2015.04); *H01M 10/6568* (2015.04); *H01M 10/663* (2015.04); *B60H 2001/00307* (2013.01); *H01M 10/615* (2015.04)

(58) Field of Classification Search
CPC ............... B60H 1/00292; B60H 1/143; B60H 1/00914; B60H 2001/0015; B60H 2001/00164; B60H 2001/00278; B60H 2001/3279; B60H 2001/00307; F25B 2400/3279; F25B 2400/0403; F25B 5/02; F25B 2313/0214; F25B 2313/0233; F25B 2313/02331; H01M 10/613; H01M 10/6568; H01M 10/625; H01M 10/663; H01M 10/00278; H01M 10/615
See application file for complete search history.

(56) References Cited

U.S. PATENT DOCUMENTS

| | | | | |
|---|---|---|---|---|
| 2002/0035843 | A1* | 3/2002 | Kampf | B60H 1/00328 62/231 |
| 2004/0074246 | A1* | 4/2004 | Kurata | B60H 1/00328 62/196.4 |
| 2008/0295535 | A1* | 12/2008 | Robinet | B60H 1/00278 62/259.2 |
| 2011/0139397 | A1* | 6/2011 | Haussmann | B60H 1/00278 165/43 |
| 2012/0085114 | A1 | 4/2012 | Graaf et al. | |
| 2012/0159978 | A1* | 6/2012 | Shih | B60H 1/00278 62/180 |

FOREIGN PATENT DOCUMENTS

| | | |
|---|---|---|
| FR | 2 805 926 A1 | 9/2001 |
| FR | 2 940 631 A1 | 7/2010 |

OTHER PUBLICATIONS

English language abstract and machine-assisted English translation for DE 10 2010 033 188 extracted from espacenet.com database on Nov. 6, 2014, 21 pages.

English language abstract and machine-assisted English translation for DE 10 2010 039 028 extracted from espacenet.com database on Nov. 6, 2014, 18 pages.

English language abstract and machine-assisted English translation for FR 2 805 926 extracted from espacenet.com database on Nov. 6, 2014, 31 pages.

English language abstract and machine-assisted English translation for FR 2 940 631 extracted from espacenet.corn database on Nov. 6, 2014, 14 pages.

* cited by examiner

HEATING, VENTILATION AND/OR AIR-CONDITIONING EQUIPMENT COMPRISING A DEVICE FOR CONTROLLING THE TEMPERATURE OF A BATTERY, AND METHOD FOR IMPLEMENTING SAME

RELATED APPLICATIONS

This application is the National Stage of International Patent Application No. PCT/EP2013/058204, filed on Apr. 19, 2013, which claims priority to and all the advantages of French Patent Application No. 12/53763, filed on Apr. 24, 2012, the content of which is incorporated herein by reference.

The subject matter of the invention is heating, ventilation and/or air-conditioning equipment comprising a device for controlling the temperature of a motor vehicle battery. The invention is particularly suited to heating, ventilation and/or air-conditioning equipment comprising a device for controlling the temperature of a battery of an electric or hybrid motor vehicle.

The invention also relates to a method for using such heating, ventilation and/or air-conditioning equipment according to various operating modes.

Motor vehicles, in particular electric or hybrid vehicles where the propulsion is provided at least partially by an electric motor, are normally equipped with electrical components, such as in particular an electric motor or a battery. In particular, cells are arranged in parallel in a protective casing in order to form a battery or a battery pack.

The charging and discharging of a battery are exothermic processes. However, in the case of an excessively high temperature, that is to say above a predefined maximum threshold, the corrosion reactions are accelerated and the result may be a reduction in the service life of the battery. There is also a risk of thermal runaway that may go as far as to destroy the battery. On the other hand, in the case of excessively low temperature, that is to say below a predefined minimum threshold, the length of time that the battery charge lasts may greatly decrease.

It is therefore important to monitor and balance the temperature of the battery. In order to control the temperature of the battery, using a temperature control device is known.

Such a temperature control device uses a heat-transfer fluid capable of absorbing the heat emitted by the battery cells in order to discharge it and thus cool them. The heat-transfer fluids generally used are a gas, for example ambient air, or liquids, for example water. A liquid is however favoured since it is a better heat conductor than a gas.

Moreover, vehicles are frequently equipped with heating, ventilation and/or air-conditioning equipment for controlling the temperature of the internal space of the passenger compartment of a vehicle by delivering an internal air flow at the desired temperature.

The heating, ventilation and/or air-conditioning equipment generally comprises an air-conditioning loop in which a refrigerating fluid circulates.

Heating, ventilation and/or air-conditioning equipment is also known further comprising a temperature control loop intended for the temperature management of electrical components of the vehicle.

More precisely, the temperature control loop is associated with the air-conditioning loop so as to allow a heat exchange between the refrigerating fluid and the heat-transfer fluid, for example intended for cooling the battery.

On the other hand, for heating the battery, the regulation loop comprises an additional heating device, using for example electrical resistors or resistors with a positive temperature coefficient. The heat-transfer fluids heated by such a heating device may, in this case, provide heat for heating the battery. An additional heating device of this type is essential for regulating the temperature of the battery, in particular in low temperatures in winter, where it is necessary to increase the temperature of the battery before beginning to charge it. These additional heating devices are generally incorporated in the housing protecting the battery pack.

However, such a solution using the air-conditioning loop for cooling but requiring an additional heating device for heating the battery is bulky and is difficult to implement inside the battery pack or close to the battery pack.

Another solution is also known in which a heat-transfer fluid circuit is used for regulating the temperature of the battery with firstly a cooler for cooling the heat-transfer fluid and secondly an additional electrical heating device for heating the heat-transfer fluid. This solution with a cooler and a device for heating the heat-transfer fluid is particularly bulky.

According to another solution, in the battery pack, channels for circulating the refrigerating fluid coming from the air-conditioning loop are provided, defining a cold circuit, and channels comprising, for example, electrical resistors, for defining a hot circuit. As before, such a solution requires two systems to be provided, one for cooling the battery and the other for heating the battery.

The objective of the invention is therefore to overcome the drawbacks of the systems of the prior art described above by proposing heating, ventilation and/or air-conditioning equipment for a motor vehicle that is simple and comprises at least one temperature control device capable of cooling and heating the battery.

For this purpose, the subject matter of the invention is heating, ventilation and/or air-conditioning equipment comprising a device for controlling the temperature of the battery of a motor vehicle, comprising at least a compressor, a condenser, a first expansion member, a thermal conditioning exchanger for exchanging heat between a refrigerating fluid and a heat-transfer fluid, and switching means, In addition, the temperature control device comprises at least one bypass branch connecting an outlet of the compressor to an inlet of the thermal conditioning exchanger and bypassing the condenser and, optionally, the first expansion member.

More specifically, the switching means comprise at least a first control valve arranged at the outlet of the compressor.

In addition, or as an alternative, the switching means comprise at least a second control valve, arranged upstream of the first expansion member, in the direction of circulation of the refrigerating fluid.

Advantageously, the temperature control device comprises a cooling branch arranged between the condenser and the second control valve. Preferably, the cooling branch comprises a non-return valve, arranged between the condenser and the second control valve.

Moreover, the temperature control device may comprise at least a second expansion member, arranged upstream of the thermal conditioning exchanger, in the direction of circulation of the refrigerating fluid, and, preferably, arranged in parallel with the first expansion member.

Moreover, the heating, ventilation and/or air-conditioning equipment according to the present invention comprises an air-conditioning loop for an internal air flow intended to be distributed in a passenger compartment of the vehicle, comprising at least the compressor and the condenser.

According to the present invention, the air-conditioning loop comprises at least one expansion member, referred to as the third expansion member, interposed between the condenser and an evaporator.

Advantageously, the heat-transfer fluid is a thermal conditioning air flow capable of being in contact with cells of the battery after heat exchange with the refrigerating fluid.

The temperature control device then comprises a fan for sending the thermal conditioning air flow to the thermal conditioning exchanger.

Alternatively, the heat-transfer fluid is a heat-transfer liquid preferably circulating in circulation channels, capable of being in contact with cells of the battery.

The present invention also relates to a method for controlling the temperature of a battery in a motor vehicle implemented by a heating, ventilation and/or air-conditioning installation as described above, comprising a step of selecting an operating mode from at least an operating mode referred to as "cooling" and an operating mode referred to as "heating", so that:

in the operating mode referred to as "cooling", the refrigerating fluid, emerging from the compressor, passes through the condenser, the first expansion member and the thermal conditioning exchanger, and in the operating mode referred to as "heating", the refrigerating fluid, emerging from the compressor, bypasses the first expansion member and passes through the thermal conditioning exchanger.

The method for controlling the temperature of a battery according to the present invention is implemented by heating, ventilation and/or air-conditioning equipment comprising a first control valve arranged at the outlet of the compressor and a second control valve arranged upstream of the first expansion member, in the direction of circulation of the refrigerating fluid.

According to this configuration, in the operating mode referred to as "cooling", the method comprises:

a step of switching the first control valve so that the refrigerating fluid circulates from the compressor to the condenser, and a step of switching the second control valve, so that the refrigerating fluid circulates from the condenser to the first expansion member and through the thermal conditioning exchanger.

According to this same configuration, in the operating mode referred to as "heating", the method comprises:

a step of switching the first control valve so that the refrigerating fluid circulates from the compressor to the second control valve, a step of switching the second control valve so that the refrigerating fluid circulates from the first control valve to the thermal conditioning exchanger.

The various features, variations and/or embodiments of the present invention can of course be combined with one another according to various combinations insofar as they are not incompatible with or exclusive of one another.

Figure 2:
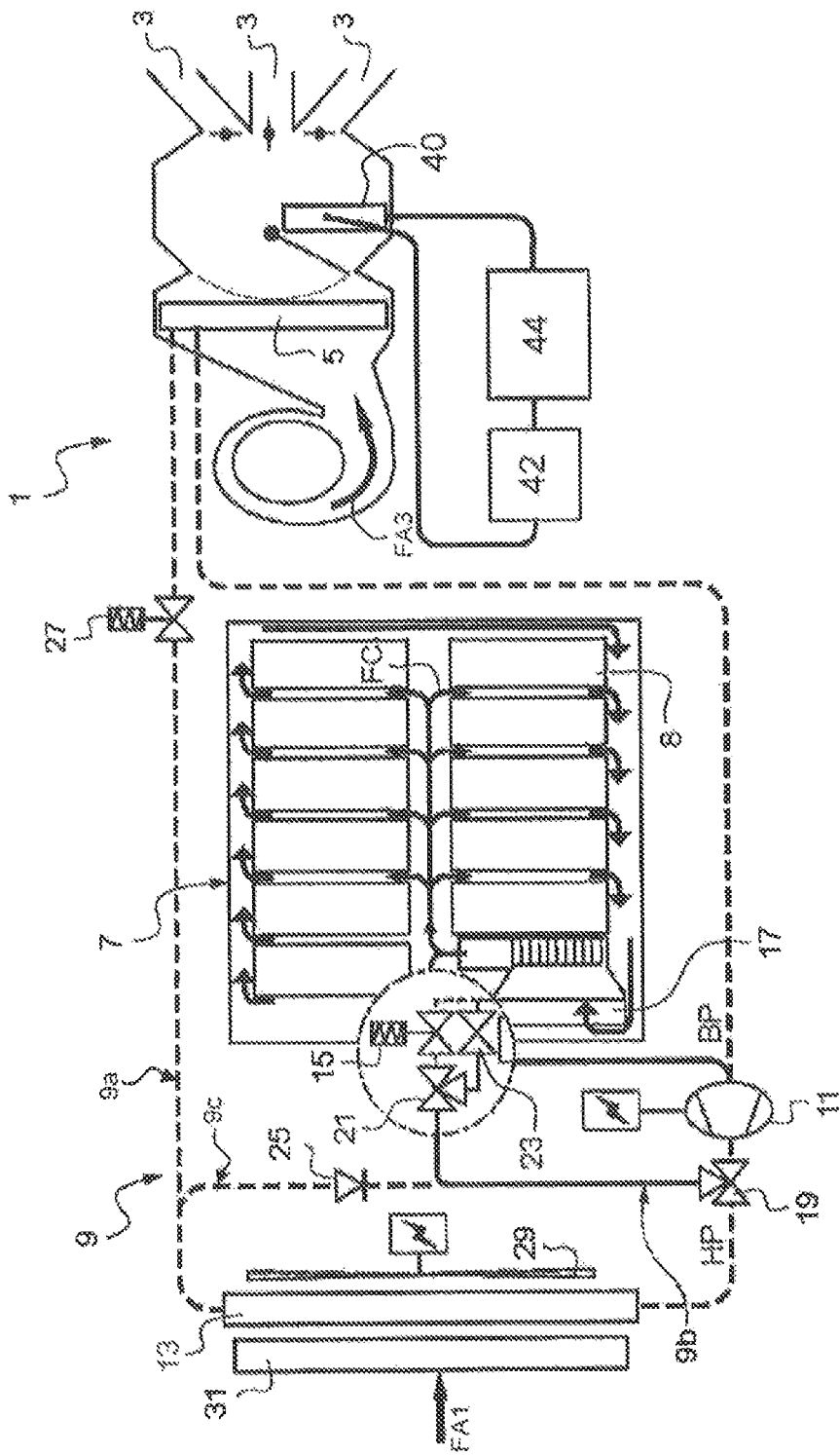
Figure 3:
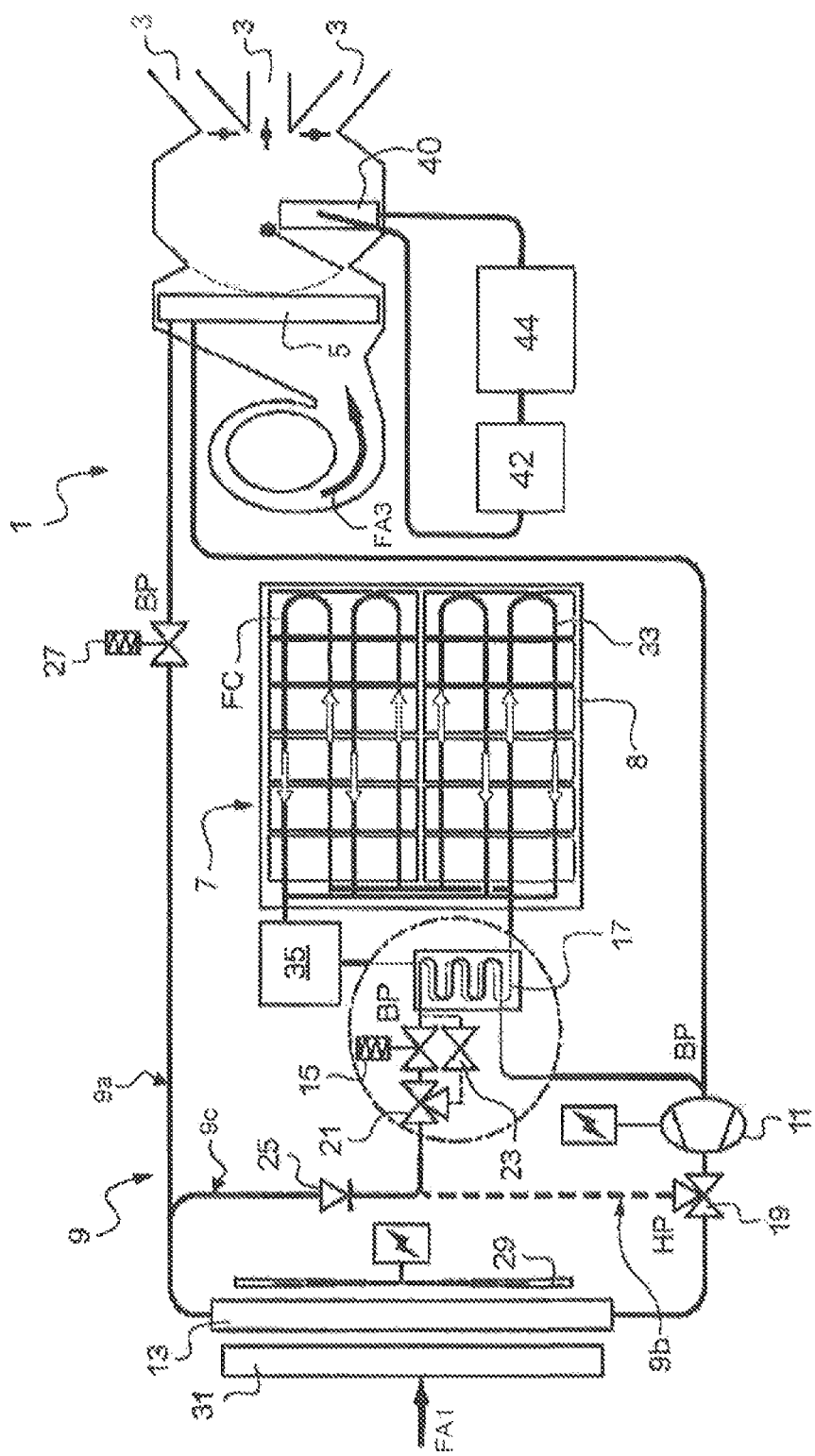
Figure 4:
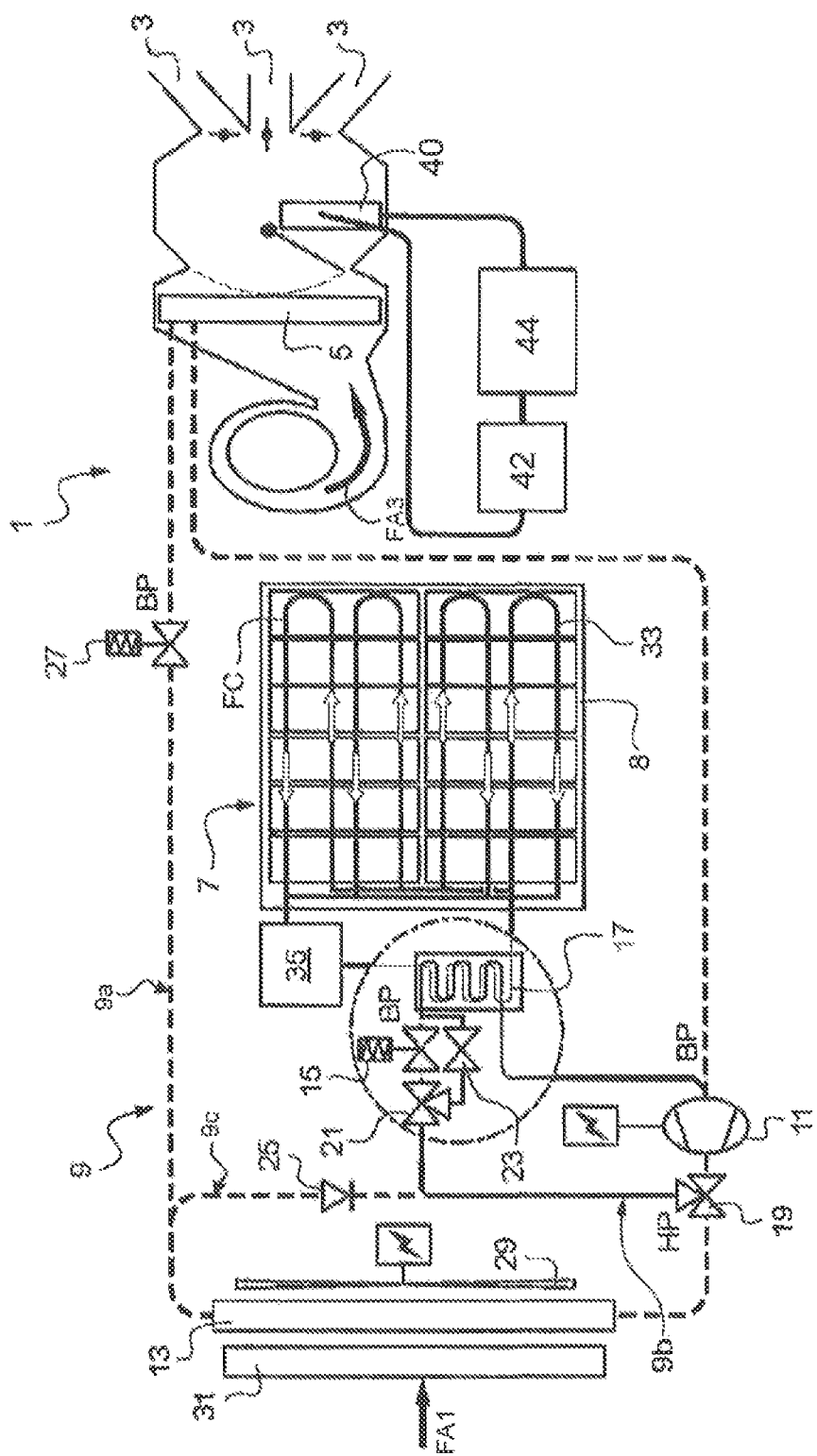

The present invention will be understood better and other features and advantages will emerge further upon reading the following detailed description including variations given by way of illustration with reference to the accompanying drawings, presented by way of non-limiting examples, which can serve to supplement understanding of the present invention and the summary of the implementation thereof and, where applicable, contribute to the definition thereof, in which:

FIG. 1 is a schematic view of heating, ventilation and/or air-conditioning equipment for a motor vehicle, comprising a temperature control device according to a first variation, in an operating mode referred to as "cooling", FIG. 2 is a schematic view of the heating, ventilation and/or air-conditioning equipment in FIG. 1 in an operating mode referred to as "heating", FIG. 3 is a schematic view of heating, ventilation and/or air-conditioning equipment for a motor vehicle, comprising a temperature control device according to a second variation, in an operating mode referred to as "cooling", and FIG. 4 is a schematic view of the heating, ventilation and/or air-conditioning equipment in FIG. 3 in an operating mode referred to as "heating".

It should be noted that, in the drawings, the structural and/or functional elements common to the various embodiments may have the same reference numerals. Thus, unless mentioned to the contrary, such elements have identical structural, dimensional and physical properties.

According to the present invention, the terms "downstream", "upstream", "in series" and "in parallel" qualify the position of one component with respect to another, in the direction of circulation of refrigerating fluid in an air-conditioning loop and/or a temperature control device.

FIGS. 1 and 2 schematically show heating, ventilation and/or air-conditioning equipment 1 for a motor vehicle, comprising a temperature control device 9 according to a first variation, respectively, in an operating mode referred to as "cooling" and in an operating mode referred to as "heating".

Such heating, ventilation and/or air-conditioning equipment 1 comprises at least one heating, ventilation and/or air-conditioning unit making it possible in particular to modify the aerothermal parameters of a vehicle passenger compartment by delivering an internal air flow FA3 at a suitable temperature in the passenger compartment, for example by means of at least one air inlet vent to at least one vent 3 for diffusing the internal air flow FA3 in the passenger compartment. The diffusion vent 3 may be in particular a de-icing/de-misting vent, intended to deliver the internal air flow FA3 to a windscreen and/or front windows of the vehicle, a ventilation vent, intended to deliver the internal air flow FA3 to the passengers of the vehicle, or a low-level diffusion vent, intended to deliver the internal air flow FA3 to the bottom parts of the vehicle passenger compartment.

The heating, ventilation and/or air-conditioning equipment 1 comprises an air-conditioning loop 9a in which a refrigerating fluid circulates, comprising in particular an evaporator 5. Advantageously, the evaporator 5 is arranged in the heating, ventilation and/or air-conditioning unit. The evaporator 5 makes it possible to cool and/or dehumidify the internal air flow FA3 intended to be diffused in the passenger compartment at a suitable temperature.

In addition, in order to bring the internal air flow FA3 intended to be diffused in the passenger compartment to a suitable temperature, the heating, ventilation and/or air-conditioning unit also houses a heating radiator 40. According to a particular embodiment, the heating radiator 40 has a heating fluid passing through it, circulating in a heating circuit. The heating circuit comprises in particular a pump 42 and a heating device 44 for heating the heating fluid. The heating device 44 is, for example, an electric heating radiator, in particular at high voltage.

FIG. 1 also shows a battery 7, or battery pack 7, comprising a plurality of cells 8 arranged in parallel in a housing forming the battery pack 7.

In addition, the heating, ventilation and/or air-conditioning equipment 1 comprises a device 9 for controlling the temperature of the battery pack 7, connected to all or part of the air-conditioning loop 9a according to the present invention.

With reference to FIG. 1, a first variant embodiment of the temperature control device 9 is now described.

The temperature control device 9 comprises a cooling branch 9c in which the refrigerating fluid circulates for cooling the battery pack 7, and a bypass branch 9b in which the refrigerating fluid for heating the battery pack 7 circulates.

The temperature control device 9 comprises in series:
- a compressor 11 for compressing and circulating the refrigerating fluid,
- a condenser 13 for providing heat exchange between the refrigerating fluid and a first air flow FA1, such as an external air flow FA1, advantageously moved by the dynamics of the vehicle and/or by a powered fan unit 29,
- at least a first expansion member 15, and
- a thermal conditioning exchanger 17 for providing a heat exchange between the refrigerating fluid and a heat-transfer fluid FC, in particular a second air flow FA2, such as a thermal conditioning air flow FA2.

According to the present invention, a compressor 11 and the condenser 13 also form part of the air-conditioning loop 9a.

The heat-transfer fluid FC, in particular the thermal conditioning air flow FA2, is circulated for example by the action of a propulsion member (not shown), in particular a powered fan unit, or fan, or a pump according to the type of heat-transfer fluid FC used, in closed loop in the battery pack 7.

The cooling branch 9c is arranged so that the refrigerating fluid at the outlet of the condenser 13 circulates to the first expansion member 15 and the thermal conditioning exchanger 17.

The bypass branch 9b is arranged so that the refrigerating fluid at the outlet of the compressor 11 circulates directly to the thermal conditioning exchanger 17, bypassing the condenser 13 and the first expansion member 15.

The bypass branch 9b forms a diversion for diverting the refrigerating fluid to the thermal conditioning exchanger 17 without passing through the condenser 13. Preferably, in the bypass branch 9b, the refrigerating fluid FR does not undergo any expansion.

The bypass branch 9b is shown in dotted lines in FIG. 1 and in solid lines in FIG. 2. Conversely, the cooling branch 9c is shown in solid lines in FIG. 1 and in dotted lines in FIG. 2.

By convention, the dotted lines are used to define a part of the air-conditioning loop 9a and/or of the temperature control device 9 in which the refrigerating fluid is not circulating and the solid lines are used to define a part of the air-conditioning loop 9a and/or of the temperature control device 9 in which the refrigerating fluid is circulating.

In operation, the compressor 11 draws in the refrigerating fluid in the gaseous state at low pressure and low temperature, as illustrated schematically by the initials "BP" in the drawings.

The refrigerating fluid comes for example from the evaporator 5 of the air-conditioning loop 9a and/or from the thermal conditioning exchanger 17 of the temperature control device 9.

The compression raises the pressure and temperature of the refrigerating fluid, as illustrated schematically by the initials "HP" in the drawings.

The condenser 13 is for example arranged inside the vehicle at the front face so as to be passed through by the external air flow FA1, coming from the outside of the vehicle.

The condenser 13 is capable of receiving the refrigerating fluid in the gaseous hot state. When condensing, the refrigerating fluid in the gaseous state yields heat to the external air flow FA1.

The first expansion member 15 reduces the pressure and temperature of the refrigerating fluid before entering the thermal conditioning exchanger 17, in which the refrigerating fluid undergoes evaporation, in the operating mode referred to as "cooling" of the battery pack 7.

Under such conditions, the thermal conditioning exchanger 17 is capable of cooling the heat-transfer fluid FC circulating in the battery pack 7 when the refrigerating fluid is circulating in the cooling branch 9c or of heating the heat-transfer fluid FC circulating in the battery pack 7 when the refrigerating fluid is circulating in the bypass branch 9b.

The operating mode referred to as "cooling" for cooling the battery pack 7, shown in FIG. 1, and the operating mode referred to as "heating" for heating the battery pack 7, shown in FIG. 2, will be described in greater detail below.

In the operating mode referred to as "cooling" of the battery pack 7, the refrigerating fluid entering the thermal conditioning exchanger 17 absorbs the heat of the heat-transfer fluid FC while evaporating, thereby having the effect of cooling the heat-transfer fluid FC.

In the operating mode referred to as "heating" of the battery pack 7, the refrigerating fluid entering the conditioning heat exchanger yields heat to the heat-transfer fluid FC, thereby having the effect of heating the heat-transfer fluid FC.

According to the present invention, the same thermal conditioning exchanger 17 may be used both in the operating mode referred to as "cooling" of the battery pack 7 and in the operating mode referred to as "heating" of the battery pack 7, without requiring any additional heating device.

The thermal conditioning exchanger 17 is also arranged with an outlet connected to the inlet of the compressor 11. Thus the refrigerating fluid, at low pressure and low temperature, at the outlet of the thermal conditioning exchanger 17, returns to the compressor 11 in order to recommence a cycle.

The temperature control device 9 also comprises switching means for changing between the operating mode referred to as "cooling" described in FIG. 1 and the operating mode referred to as "heating" described in FIG. 2.

According to the embodiment illustrated, the switching means comprise at least a first control valve 19, for example a first three-way valve 19, arranged at the outlet of the compressor 11. Advantageously, the first control valve 19 is controlled by a control means (not shown).

The first control valve 19 comprises passages making it possible, according to the configuration defined, to circulate the refrigerating fluid from the compressor 11:
  to the condenser 13, as shown in solid lines in FIG. 1,
    and/or
  to the thermal conditioning exchanger 17, passing through the bypass branch 9b, as shown in solid lines in FIG. 2.

Other means can of course be envisaged for defining a first path of the refrigerating fluid from the compressor 11 to the condenser 13, and a second path for the refrigerating fluid, referred to as the bypass path, from the compressor 11 to the thermal conditioning exchanger 17.

According to the embodiment illustrated, the switching means also comprise a second control valve 21, for example a second three-way valve 21, arranged upstream of the first expansion member 15 in the direction of circulation of the refrigerating fluid. More precisely, according to the embodiment illustrated, the second control valve 21 is arranged between the first control valve 19 and the first expansion member 15.

The second control valve 21 comprises passages making it possible, according to the configuration defined, to circulate the refrigerating fluid:
- from the condenser 13, via the cooling branch 9c, to the first expansion member 15, and/or
- from the first control valve 19, via the bypass branch 9b, to the thermal conditioning exchanger 17, without passing through the condenser 13 and the first expansion member 15.

For this purpose, the temperature control device 9 comprises, according to the embodiment illustrated, a second expansion member 23 arranged in parallel with the first expansion member 15.

Preferably, the cross-section of flow of the second expansion member 23 is appreciably greater than the cross-section of flow of the first expansion member 5.

Despite the expansion effected by the second expansion member 23, the refrigerating fluid remains at a high temperature, allowing the refrigerating fluid to yield heat to the heat-transfer fluid FC.

According to the embodiment shown in FIGS. 1 and 2, the second expansion member 23 therefore makes it possible to connect the second control valve 21 to the inlet of the thermal conditioning exchanger 17 while bypassing the first expansion member 15.

To facilitate reading of the drawings, the region comprising the second control valve 21, the first expansion member 15 and the second expansion member 23 is enlarged schematically, as illustrated by the circle in a dotted line.

By way of example, the first expansion member 15 is a thermostatic pressure-reducing device comprising, or coupled to, a control valve, for allowing and/or preventing the circulation of refrigerating fluid, and the second expansion member 23 is a pressure-reducing device or an orifice tube. Alternatively, the second expansion member may comprise or be coupled to a control valve for allowing and/or preventing the circulation of refrigerating fluid.

According to a variation, the first expansion member 15, the second control valve 21 and the second expansion member 23 may be combined in a single first expansion member 15.

Advantageously, a single first expansion member 15 of this type is a fluid-tight electronic pressure-reducing device able to function as an isolation valve and the maximum cross-sectional flow of which is sufficient to be able to provide both the operating mode referred to as "heating" and the operating mode referred to as "cooling".

In the operating mode referred to as "heating", the refrigerating fluid undergoes thermodynamic cycle referred to as "hot gases", in which the refrigerating fluid is successively compressed by the compressor 11 and then expanded by the second expansion member 23 or respectively the single first expansion member 15, without phase change, before returning to the compressor 11.

In the operating mode referred to as "heating", the second expansion member 23 or respectively the single first expansion member 15 causes the refrigerating fluid to undergo a pressure drop resulting in a reduction in temperature.

The second expansion member 23 or respectively the single first expansion member 15 is supplied with superheated gas, coming from the compressor 11, the density of which is much less than that of the liquid. The required cross section of flow is then much greater than in the operating mode referred to as "cooling".

In the operating mode referred to as "cooling", the first expansion member 15 or respectively the single first expansion member 15 is supplied with refrigerating fluid, in a liquid state, coming from the condenser 13.

Furthermore, it is possible to provide, on the cooling branch 9c, a non-return valve 25 arranged between the condenser 13 and the second control valve 21. Thus the non-return valve 25 allows a circulation of the refrigerating fluid only from the compressor 13 to the second control valve 21.

It is of course possible to provide any other blocking means preventing the refrigerating fluid emerging from the first control valve 19 from circulating in the cooling branch 9c towards the condenser 13.

In addition, a third expansion member 27 arranged between the condenser 13 and the evaporator 5 of the air-conditioning loop 9a can be provided. Thus the refrigerating fluid leaving the condenser 13 may undergo an expansion, so as to reduce the pressure and temperature, before entering the evaporator 5 in order to be evaporated therein.

In the drawings, an additional heat exchanger 31 is present at the front face of the vehicle. Such an additional heat exchanger 31 is able to provide the cooling of components installed in the vehicle, such as a thermal engine in the context of a hybrid vehicle, or a power train in the context of a hybrid or electric vehicle.

The various operating modes of the temperature control device 9, previously described schematically in FIGS. 1 and 2 according to the first variation, are now described.

In FIGS. 1 and 2, the circulation of the refrigerating fluid is illustrated schematically in solid lines. On the other hand, the parts of the air-conditioning loop 9a and/or of the temperature control device 9 that are inoperative, that is to say in which the refrigerating fluid does not circulate, are shown in dotted lines.

The method of using the temperature control device 9 comprises a step of selecting an operating mode from an operating mode referred to as "cooling" or an operating mode referred to as "heating" of the battery pack 7.

Depending on the operating mode chosen, the first control valve 19 and the second control valve 21 are controlled accordingly so as to allow the refrigerating fluid to circulate in the cooling branch 9c and/or in the bypass branch 9b.

FIG. 1 shows the temperature control device 9 used in the operating mode referred to as "cooling", to cool the battery pack 7.

In the operating mode referred to as "cooling", the refrigerating fluid emerging from the compressor 10 is condensed in the condenser 13 and is then routed, via the cooling branch 9c, to the first expansion member 15, in which it undergoes expansion, before passing into the thermal conditioning exchanger 17, through which the heat-transfer fluid FC passes, in particular the thermal conditioning air flow FA2, thus cooled.

To do this, the method comprises:
- a step of switching the first control valve 19 so that the refrigerating fluid circulates from the compressor 11 to the condenser 13
- a step of switching the second control valve 21, so that the refrigerating fluid circulates from the condenser 13 to the thermal conditioning exchanger 17, passing through the first expansion member 15, and
- a step of evaporating the refrigerating fluid in the thermal conditioning exchanger 17.

Thus, in passing through the condenser 13, the refrigerating fluid in the gaseous state compressed at high pressure and high temperature yields heat to the external air flow FA1.

Part of the refrigerating fluid emerging from the condenser 13 circulates, through the cooling branch 9c, to the thermal conditioning exchanger 17 passing through the first expansion member 15. As the refrigerating fluid passes through the first expansion member 15, the pressure and temperature of the refrigerating fluid are lowered. Thus, on passing through the thermal conditioning exchanger 17 functioning as an evaporator, the refrigerating fluid, in evaporating, absorbs the heat of the heat-transfer fluid FC.

The cooled heat-transfer fluid FC then circulates in the battery pack 7, around the cells 8, in order to cool them.

The refrigerating fluid emerging from the thermal conditioning exchanger 17 then returns to the compressor 18 in order to recommence a cycle.

Moreover, another part of the refrigerating fluid emerging from the condenser 13 can circulate, in series, in the third expansion member 27 in order to expand the refrigerating fluid, and then in the evaporator 5 in order to cool the internal air flow FA3 intended to be diffused in the passenger compartment of the vehicle, and can then return to the compressor 11 in order to recommence a cycle.

With reference to FIG. 2, the temperature control device 9 used in the operating mode referred to as "heating" to heat the battery pack 7 is now described.

In the operating mode referred to as "heating", the refrigerating fluid emerging from the compressor 11 exchanges heat with the heat-transfer fluid FC in the thermal conditioning exchanger 17.

To do this, the method comprises:
- a step of switching the first control valve 19 so that the refrigerating fluid circulates from the compressor 11 to the second control valve 21, and
- a step of switching the second control valve 21 so that the refrigerating fluid circulates from the first control valve 19 to the thermal conditioning exchanger 17.

The thermal conditioning exchanger 17 receives, at its inlet, the refrigerating fluid in the hot gaseous state. Passing through the thermal conditioning exchanger 17, the refrigerating fluid, in the gaseous state compressed at high pressure and high temperature, yields heat to the heat-transfer fluid FC.

The heated heat-transfer fluid FC then circulates in the battery pack 7, around the cells 8, in order to heat them.

The refrigerating fluid emerging from the thermal conditioning exchanger 17 then returns to the compressor 11 in order to recommence a cycle.

FIG. 3 and schematically show heating, ventilation and/or air-conditioning equipment 1 for a motor vehicle, comprising a temperature control device 9 according to a second variation, respectively, in an operating mode referred to as "cooling" and in an operating mode referred to as "heating".

The second variation differs from the first variation shown in FIGS. 1 and 2 in that the thermal conditioning exchanger 17 is no longer an exchanger of heat between a thermal conditioning air flow and the refrigerating fluid. According to the second variation, the thermal conditioning exchanger 17 is an exchanger of heat between the refrigerating fluid and a heat-transfer liquid, such as in particular glycol water. The second variation is referred to as indirect, contrary to the first variation shown in FIGS. 1 and 2.

According to the second variation, the battery pack 7 comprises channels 33 for circulation of the heat-transfer fluid FC, arranged in direct contact with the cells 8 of the battery pack 7 in order to provide temperature control of the battery pack 7 by means of the heat-transfer fluid FC, in particular a heat-transfer liquid LC.

In a similar manner to the first variation, in the operating mode referred to as "cooling" of the battery pack 7, the refrigerating fluid entering the thermal conditioning exchanger 17 absorbs the heat from the heat-transfer fluid FC, in particular the heat-transfer liquid LC, thereby having the effect of cooling the heat-transfer fluid FC.

In the operating mode referred to as "heating" of the battery pack 7, the thermal conditioning exchanger 17 receives the refrigerating fluid in the hot gaseous state and yields heat to the heat-transfer fluid FC, thereby having the effect of heating the heat-transfer fluid FC.

The same thermal conditioning exchanger 17 may be used both in the operating mode referred to as "cooling" of the battery pack 7 and in the operating mode referred to as "heating" of the battery pack 7 without requiring any additional heating device.

Furthermore, according to the second variation, a means 35, for example a pump 35, for circulating the heat-transfer fluid FC is for example provided. Preferably, the circulation means 35 is arranged between the battery pack 7 and the thermal conditioning exchanger 17.

The various operating modes of the temperature control device 9 are now described according to the second variation.

In FIGS. 3 and 4, the circulation of the refrigerating fluid is illustrated schematically in solid lines. On the other hand, the parts of the air-conditioning loop 9a and/or of the temperature control device 9 that are inoperative, that is to say in which the refrigerating fluid does not circulate, are shown in dotted lines.

In a similar manner to the first variation, the method of using the temperature control device 9 comprises a step of selecting from an operating mode referred to as "cooling" or an operating mode referred to as "heating" of the battery pack 7.

Depending on the operating mode chosen, the first control valve 19 and the second control valve 21 are controlled accordingly to allow the refrigerating fluid to circulate in the cooling branch 9a and/or in the bypass branch 9b.

FIG. 3 shows the temperature control device 9 used in the operating mode referred to as "cooling" for cooling the battery pack 7.

In this operating mode referred to as "cooling", the refrigerating fluid emerging from the compressor 11 is condensed in the condenser 13 and is then routed, via the cooling branch 9c, to the first expansion member 15, in which it undergoes expansion, before passing into the thermal conditioning exchanger 17, through which the heat-transfer fluid FC passes, in particular the heat-transfer liquid LC, thus cooled.

To do this, the method comprises:
- a step of switching the first control valve 19 so that the refrigerating fluid circulates from the compressor 11 to the condenser 13, a step of switching the second control valve 21, so that the refrigerating fluid circulates from the condenser 13 to the thermal conditioning exchanger 17, passing through the first expansion member 15, and a step of evaporating the refrigerating fluid in the thermal conditioning exchanger 17.

Thus, when passing through the condenser 13, the refrigerating fluid in the gaseous state compressed at high pressure and high temperature yields heat to the external air flow FA1.

Part of the refrigerating fluid emerging from the compressor 13 circulates to the thermal conditioning exchanger 17 passing through the first expansion member 15. As the refrigerating fluid passes through the first expansion member 15, the pressure and temperature of the refrigerating fluid are lowered.

The thermal conditioning exchanger 17 receives at its inlet, firstly, the low-pressure refrigerating fluid and, secondly, the heat-transfer fluid FC.

On passing through the thermal conditioning exchanger 17, the refrigerating fluid absorbs the heat from the heat-transfer fluid FC passing through the thermal conditioning exchanger 17, the heat-transfer fluid FC being thus cooled.

The method may comprise a step of operating the means 35 of circulating the heat-transfer fluid FC so that the heat-transfer fluid FC circulates in the circulation channels 33 before returning to the thermal conditioning exchanger 17.

The circulation of the heat-transfer fluid FC is shown schematically by the arrows in FIG. 3.

The heat-transfer fluid FC, in particular the heat-transfer liquid LC, cooled, and circulating in the circulation channels 33, therefore cools the cells 8 of the battery pack 7.

The refrigerating fluid emerging from the thermal conditioning exchanger 17 then returns to the compressor 11 in order to recommence a cycle.

In addition, another part of the refrigerating fluid emerging from the condenser 13 can circulate in series in the third expansion member 27 in order to provide expansion of the refrigerating fluid, and then in the evaporator 5, and can return to the compressor 11 in order to recommence a cycle.

With reference to FIG. 4, the steps of the method in the operating mode referred to as "heating" of the battery 7 are now described.

In the operating mode referred to as "heating", the refrigerating fluid emerging from the compressor 11 exchanges heat with the heat-transfer fluid FC, in particular the heat-transfer liquid LC, in the thermal conditioning exchanger 17. To do this, the method comprises:

a step of switching the first control valve 19 so that the refrigerating fluid circulates from the compressor 11 to the second control valve 21, and a step of switching the second control valve 21 so that the refrigerating fluid circulates from the first control valve 19 to the thermal conditioning exchanger 17.

The thermal conditioning exchanger 17 therefore receives at its inlet firstly the refrigerating fluid in the hot gaseous state and secondly the heat-transfer fluid FC, in particular the heat-transfer liquid LC.

When passing through the thermal conditioning exchanger 17, the refrigerating fluid in the gaseous state compressed at high pressure and high temperature yields heat to the heat-transfer fluid FC.

The method may comprise a step of operating the means 35 of circulating the heat-transfer fluid FC so that the heat-transfer fluid FC circulates in the circulation channels 33 before returning to the thermal conditioning exchanger 17.

The heated heat-transfer fluid FC circulating in the circulation channels 33 then makes it possible to heat the cells 8 of the battery pack 7.

The refrigerating fluid emerging from the thermal conditioning exchanger 17 then returns to the compressor 11 in order to recommence a cycle.

It will therefore be understood that the arrangement of the thermal conditioning exchanger 17 and the control of the switching means makes it possible to easily change operating modes, between the operating mode referred to as "cooling" and the operating mode referred to as "heating" of the battery pack 7, using fewer components than in the known arrangements, since the same thermal conditioning exchanger 17 is used for the operating mode referred to as "cooling" and the operating mode referred to as "heating", using a bypass for bypassing at least the condenser 13, and optionally the first expansion member 15, in the operating mode referred to as "heating".

Clearly the invention is not limited to the embodiments described above and provided solely by way of example. It encompasses various modifications, alternative forms and other variations that can be envisaged by a person skilled in the art in the context of the present invention and in particular all combinations of the various operating modes described above, which can be taken separately or in combination.

The invention claimed is:

1. Heating, ventilation and/or air-conditioning equipment comprising a temperature control device for controlling a temperature of a battery of a motor vehicle, the heating, ventilation and/or air-conditioning equipment comprising at least a compressor, a condenser, a first expansion member, a thermal conditioning exchanger for exchanging heat between a refrigerating fluid and a heat-transfer fluid, and switching means, with the temperature control device comprising at least one bypass branch connecting an outlet of the compressor to an inlet of the thermal conditioning exchanger while bypassing the condenser and the first expansion member, wherein the switching means comprises at least a first control valve arranged at the outlet of the compressor and a second control valve, and the first and second control valves are arranged upstream of the first expansion member in a direction of circulation of the refrigerating fluid, and wherein the first control valve and the second control valve are disposed successively in the bypass branch, and wherein the first control valve and the second control valve are multi-way valves, and wherein the thermal conditioning exchanger has a single flow path for refrigerant fluid within the thermal conditioning exchanger and is configured to be used in a cooling mode of the battery using a cooling branch which connects an outlet of the condenser and the first expansion member upstream of the thermal conditioning exchanger and in a heating mode of the battery using the bypass branch without requiring an additional heating device.

2. Heating, ventilation and/or air-conditioning equipment according to claim 1, wherein the temperature control device comprises a cooling branch arranged between the condenser and the second control valve.

3. Heating, ventilation and/or air-conditioning equipment according to claim 2, wherein the cooling branch comprises a non-return valve arranged between the condenser and the second control valve.

4. Heating, ventilation and/or air-conditioning equipment according to claim 1, wherein the temperature control device comprises at least a second expansion member arranged upstream of the thermal conditioning exchanger in a direction of circulation of the refrigerating fluid.

5. Heating, ventilation and/or air-conditioning equipment according to claim 4, wherein the second expansion member is arranged in parallel with the first expansion member.

6. Heating, ventilation and/or air-conditioning equipment according to claim 1, further comprising a air-conditioning loop for air conditioning of an internal air flow intended to be distributed in a passenger compartment of the motor vehicle, with the loop comprising at least the compressor and the condenser.

7. Heating, ventilation and/or air-conditioning equipment according to claim 6, wherein the air-conditioning loop comprises at least one expansion member interposed between the condenser and an evaporator.

8. Heating, ventilation and/or air-conditioning equipment according to claim 1, wherein the heat-transfer fluid is a thermal conditioning air flow.

9. Heating, ventilation and/or air-conditioning equipment according to claim 8, wherein the temperature control device comprises a fan for sending the thermal conditioning air flow to the thermal conditioning exchanger.

10. Heating, ventilation and/or air-conditioning equipment according to claim 1, wherein the heat-transfer fluid is a heat-transfer liquid.

11. Heating, ventilation and/or air-conditioning equipment according to claim 10, wherein the heat-transfer liquid circulates in circulation channels capable of being in contact with cells of the battery.

12. A method for controlling the temperature of the battery in the motor vehicle implemented by heating, ventilation and/or air-conditioning equipment according to claim 1, with the method comprising a step of selecting an operating mode from at least one of a cooling operating mode and a heating operating mode, so that:
   in the cooling operating mode, the refrigerating fluid, emerging from the compressor, passes through the condenser, the first expansion member and the thermal conditioning exchanger, and
   in the heating operating mode, the refrigerating fluid, emerging from the compressor, bypasses the first expansion member and passes through the thermal conditioning exchanger.

13. A method according to claim 12, implemented by heating, ventilation and/or air-conditioning equipment comprising the first control valve arranged at the outlet of the compressor and the second control valve arranged upstream of the first expansion member, in a direction of circulation of the refrigerating fluid,
   and when the cooling operating mode is selected, the method comprises:
      a step of switching the first control valve so that the refrigerating fluid circulates from the compressor to the condenser, and
      a step of switching the second control valve so that the refrigerating fluid circulates from the condenser to the first expansion member and through the thermal conditioning exchanger.

14. A method according to claim 12, implemented by heating, ventilation and/or air-conditioning equipment comprising the first control valve arranged at the outlet of the compressor and the second control valve arranged upstream of the first expansion member in a direction of circulation of the refrigerating fluid,
   and when the heating operating mode is selected, the method comprises:
      a step of switching the first control valve so that the refrigerating fluid circulates from the compressor to the second control valve,
      a step of switching the second control valve so that the refrigerating fluid circulates from the first control valve to the thermal conditioning exchanger.

15. Heating, ventilation and/or air-conditioning equipment comprising a temperature control device for controlling a temperature of a battery of a motor vehicle, the heating, ventilation and/or air-conditioning equipment comprising at least a compressor, a condenser, a first expansion member, a thermal conditioning exchanger for exchanging heat between a refrigerating fluid and a heat-transfer fluid, and switching means, with the temperature control device comprising at least one bypass branch connecting an outlet of the compressor to an inlet of the thermal conditioning exchanger while bypassing the condenser and the first expansion member, wherein the switching means comprises at least a first control valve arranged at the outlet of the compressor and a second control valve, and the first and second control valves are arranged upstream of the first expansion member in a direction of circulation of the refrigerating fluid, and wherein the first control valve and the second control valve are disposed successively in the bypass branch, and wherein the first control valve and the second control valve are multi-way valves and wherein a second expansion member connects the second control valve to the inlet of the thermal conditioning exchanger while bypassing the first expansion member,
   and wherein the thermal conditioning exchanger has a single flow path for refrigerant fluid within the thermal conditioning exchanger and is configured to be used in a cooling mode of the battery using a cooling branch which connects an outlet of the condenser and the first expansion member upstream of the thermal conditioning exchanger and in a heating mode of the battery using the bypass branch without requiring an additional heating device.

16. Heating, ventilation and/or air-conditioning equipment according to claim 1, wherein the second expansion member is coupled to a control valve for allowing or preventing the circulation of fluid.

* * * * *